(12) United States Patent
Laselva et al.

(10) Patent No.: US 12,003,342 B2
(45) Date of Patent: Jun. 4, 2024

(54) BANDWIDTH PART AGGREGATION FOR RELIABILITY BOOST

(71) Applicant: Nokia Technologies Oy, Espoo (FI)

(72) Inventors: Daniela Laselva, Klarup (DK); Marco Centenaro, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 360 days.

(21) Appl. No.: 17/429,607

(22) PCT Filed: Feb. 14, 2019

(86) PCT No.: PCT/EP2019/053714
§ 371 (c)(1),
(2) Date: Aug. 9, 2021

(87) PCT Pub. No.: WO2020/164719
PCT Pub. Date: Aug. 20, 2020

(65) Prior Publication Data
US 2022/0116159 A1    Apr. 14, 2022

(51) Int. Cl.
*H04L 1/22* (2006.01)
*H04L 1/00* (2006.01)
(Continued)

(52) U.S. Cl.
CPC ............... *H04L 1/22* (2013.01); *H04L 1/08* (2013.01); *H04W 24/10* (2013.01); *H04W 28/04* (2013.01);
(Continued)

(58) Field of Classification Search
None
See application file for complete search history.

(56) References Cited

U.S. PATENT DOCUMENTS

2018/0332501 A1* 11/2018 Tseng .................. H04L 1/08
2018/0368132 A1* 12/2018 Babaei ................ H04L 1/1819
2020/0015120 A1*  1/2020 Lin ..................... H04L 5/0094

FOREIGN PATENT DOCUMENTS

WO    2018/156074 A1    8/2018
WO    2020/120825 A1    6/2020

OTHER PUBLICATIONS

"Revised SID: Study on NR Industrial Internet of Things (IoT)", 3GPP TSG RAN meeting #81, RP-182090, Agenda: 9.3.12, Nokia, Sep. 10-13, 2018, 5 pages.
(Continued)

*Primary Examiner* — Diane L Lo
(74) *Attorney, Agent, or Firm* — Lippes Mathias LLP (57) ABSTRACT

It is provided a method, comprising instructing a first cell to transmit a first packet data unit to a terminal on a first active bandwidth part of a first carrier of the first cell in a first frame and to instruct a second cell to transmit a second packet data unit to the terminal on a second active bandwidth part of a second carrier of the second cell in a second frame; wherein the first and second bandwidth parts have first and second bandwidth part identifiers, respectively; if the first cell is the same as the second cell: the first and second bandwidth part identifiers are different from each other, and the first and second system frame numbers are the same; and if the first cell is different from the second cell: a frequency range of the first carrier is the same as the frequency range of the second carrier.

16 Claims, 6 Drawing Sheets

(51) Int. Cl.
  *H04L 1/08* (2006.01)
  *H04W 24/10* (2009.01)
  *H04W 28/04* (2009.01)
  *H04W 28/06* (2009.01)
  *H04W 72/044* (2023.01)

(52) U.S. Cl.
  CPC ......... *H04W 28/06* (2013.01); *H04W 72/044* (2013.01); *H04L 2001/0096* (2013.01)

(56) References Cited

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.
"3rd Generation Partnership Project; Technical Specification Group Radio Access Network; NR; Physical channels and modulation (Release 15)", 3GPP TS 38.211, V15.4.0, Dec. 2018, pp. 1-96.
"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.
"3rd Generation Partnership Project; Technical Specification Group Radio Access Network; NR; Physical layer procedures for control (Release 15)", 3GPP TS 38.213, V15.4.0, Dec. 2018, pp. 1-104.
"3rd Generation Partnership Project; Technical Specification Group Radio Access Network; NR; Multiplexing and channel coding (Release 15)", 3GPP TS 38.212, V15.3.0, Sep. 2018, pp. 1-99.
"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.
"Views and evaluations for URLLC scenarios", 3GPP TSG RAN WG1 Ad-Hoc Meeting 1901, R1-1900976, Agenda: 7.2.6.4, NTT DOCOMO, Inc, Jan. 21-25, 2019, pp. 1-13.
"Evaluation of URLLC Factory Automation Scenario at 30 GHz", 3GPP TSG RAN WG1 Ad-Hoc Meeting 1901, R1-1900171, Agenda: 7.2.6.4, Ericsson, Jan. 21-25, 2019, pp. 1-7.
International Search Report and Written Opinion received for corresponding Patent Cooperation Treaty Application No. PCT/EP2019/053714, dated Oct. 30, 2019, 12 pages.
Office action received for corresponding European Patent Application No. 19705747.4, dated Jan. 27, 2023, 4 pages.

\* cited by examiner

Instruct to transmit PDUs over different BWPs of a carrier — S10

Fig. 7

PDUs received on different BWPs of a carrier? — S110
yes
Process at least one of the PDUs — S120

BANDWIDTH PART AGGREGATION FOR RELIABILITY BOOST

RELATED APPLICATION

This application was originally filed as PCT Application No. PCT/EP2019/053714, filed on Feb. 14, 2019, of which is incorporated herein by reference in its entirety.

FIELD OF THE INVENTION

The present invention relates to parallel usage of plural active bandwidth parts. In a particular case, it relates to data duplication, in which it is particularly useful in the context of URLLC.

Abbreviations

3G/4G/5G 3$^{rd}$/4$^{th}$/5$^{th}$ Generation
3GPP 3$^{rd}$ Generation Partnership Project
ACK Acknowledgment
BLER Block Error Rate
BW Bandwidth
BWP Bandwidth Part
BWPCI Bandwidth Part Configuration Index
CA Carrier Aggregation
CC Component Carrier
CE Control Element
CG Cell Group
CQI Channel Quality Information
CSI Channel State Information
CSI-RS Channel State Information—Reference Signal
DC Dual Connectivity
DCI Downlink Control Information
DL Downlink
DRB Data Radio Bearer
EESM Exponential Effective SINR Mapping
eMBB Enhanced Mobile Broadband
eNB evolved NodeB (base station of 4G)
FDD Frequency Division Duplex
gNB gNodeB (base station of 5G)
HARQ Hybrid Automatic Repeat Request
HetNet Heterogeneous Network
ICIC Interchannel Interference Cancellation
IE Information Element
IIoT Industrial Internet of Things
IoT Internet of Things
LTE Long-term Evolution
MAC Multiple Access Channel
MC Multi-Connectivity
MCS Modulation and Coding Scheme
MCG Master Cell Group
mMTC Massive Machine-Type Communication
MTC Machine-Type Communication
NACK negative-acknowledgement
NR New Radio
PBCCH Physical Broadcast Control Channel
PCell Primary Cell
PDCCH Physical Downlink Control Channel
PDCP Packet Data Convergence Protocol
PDSCH Physical Downlink Shared Channel
PDU Packet Data Unit
PRB Physical Resource Block
PSCell Primary Secondary Cell
QPSK Quadrature Phase Shift Keying
RAN Radio Access Network
Rel Release
RF Radio Frequency
RLC Radio Link Control
SA System Architecture
SCell Secondary Cell
SCG Secondary Cell Group
SCS Subcarrier Spacing
SDAP Service Data Adaptation Protocol
SIB System Information Block
SINR Signal to interference and noise ratio
SN Sequence Number
TB Transport Block
TRS Tracking Reference Signal
TS Technical Specification
UE User Equipment
UL Uplink
UPF User Plane Function
URLLC Ultra-Reliable Low-Latency Communication
vCC Virtual Component Carrier
Xn Interface between gNBs (base stations)

BACKGROUND OF THE INVENTION

The study item 3GPP RP-182090—Study on NR Industrial Internet of Things of the Rel-16 Industrial IoT (IIoT) comprises the following objective:
"L2/L3 enhancements:
   Data duplication and multi-connectivity enhancements, including (RAN2/RAN3):
   Resource efficient PDCP duplication e.g. coordination between the nodes for PDCP duplication activation and resource efficiency insurance, avoiding unnecessary duplicate transmissions etc.
   PDCP duplication with more than 2 copies leveraging (combination of) DC and CA, whereupon data transmission takes places from at most two nodes: assessment of the gains, and if beneficial, study the associated solutions.
   Potential impacts of higher layer multi-connectivity as studied by SA2."

Thus, data duplication at PDCP layer is considered an enabler of the IIoT paradigm. Indeed, PDCP data duplication offers transmit diversity boosting, thereby lowers the error probability for the duplicated packet, as errors occurring on two transmission paths are typically uncorrelated at a certain degree. PDCP data duplication is supported in the 3GPP Release 15 either across distinct component carriers (CCs) in the same network node (i.e., when combined to carrier aggregation, CA), or across two distinct nodes (i.e., when combined to dual connectivity, DC). Moreover, in future releases multi-connectivity (MC) may be also considered. MC allows to use more than two nodes at a time and/or more than two radio links to be involved in the transmission/reception operations towards a user equipment (UE), for instance where the radio links are a combination of DC and CA.

In an intra-gNB deployment of PDCP data duplication, the two (or more) transmission paths to convey the packet duplicates are instantiated at the same gNB. The intra-gNB scenario is rather important even assuming a heterogeneous network (hetnet) deployment (entailing DC), because only a fraction of the UEs present in the network can benefit from DC due to their physical proximity to one dominant serving cell. For instance, in the hetnet scenario defined by 3GPP for performance evaluation, this realistic effect is modelled assuming that only about 30% of UEs in a macro-cell area are dropped around the small cell cluster. This results in having only up to ~30% of the UEs that can benefit from DC to both the macro and small cells, whereas the remaining ~70% of UEs can be served only via the macro cell. The latter UEs can then make use of PDCP duplication for reliability boosting only if the macro cell splits its bandwidth in more-than-one CCs by making use of CA, as illustrated in FIG. 1.

Figure 1:
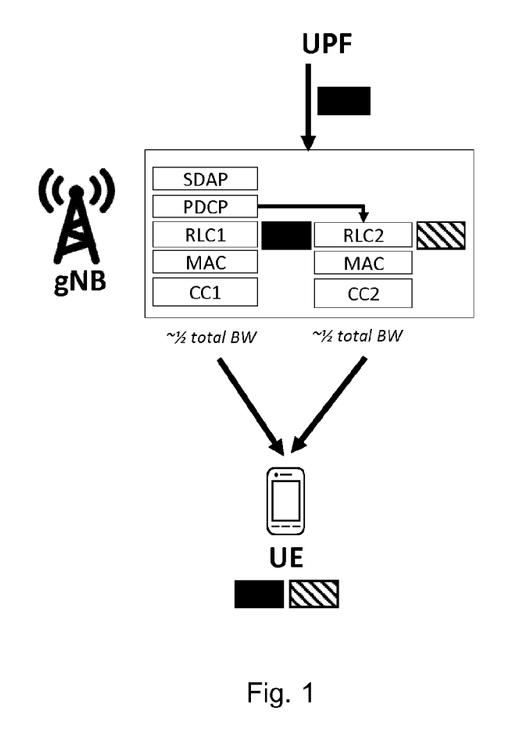
FIG. 1 shows PDCP data duplication according to 3GPP Rel-15.

FIG. 1 shows Release-15 (state of the art) PDCP data duplication through CA for downlink in an intra-gNB deployment. The gNB receives data packets (shown as a black box) from the core network (e.g. UPF), encapsulates them into PDCP PDUs and assigns them a sequence number (SN). If PDCP data duplication is deemed needed/requested, the gNB duplicates the packet at the PDCP layer. One duplicate (shown as a black box) is pushed down to the RLC entity that controls the first component carrier (denoted as CC1), and another duplicate (shown as a dashed box) to the RLC entity that controls the second component carrier (denoted as CC2). The same data packet (i.e., the PDCP PDU with a given SN) is then independently transmitted to the UE through both CCs. The duplicates have the same SN.

For the purpose of the present application, each cell is unambiguously related to a carrier (having a central frequency and a bandwidth around the central frequency). Since each cell is also unambiguously identified by its cell identifier, the carrier is unambiguously identified by the cell identifier, too.

The following further background and prior art concepts are relevant in the context of this application:
PDCP Duplication in 5G New Radio (NR) according to 3GPP Release-15:
  duplication allows PDCP PDUs to be duplicated and sent over two different RLC entities;
  the RLC entities can either belong to the same Cell Group (CG) (duplication via CA) or to different CGs (duplication via DC);
  when the same CG is used, restrictions in MAC are put in place to guarantee that the two duplicates never end up on the same carrier. If they did, they would fail at the same time, cancelling any benefits of duplicating packets;
  when different CGs are used, the carrier of the first cell must be different from the carrier of the second cell, i.e. inter-frequency scenario;
  duplication is enabled at RRC and controlled at MAC by means of a MAC Control Element (CE) for the uplink direction.
In the context of NR, the concept of bandwidth part (BWP) is introduced. Simply expressed, a BWP is a sub-band within a wider NR carrier. BWP is defined in NR Rel-15 in 3GPP TS 38.300 (see Sec. 6.10), 3GPP TS 38.211 (in Sec. 4.4.5), and 3GPP TS 38.331 (see BWP Information Element—IE), while the configuration of a BWP is described in clause 12 of 3GPP TS 38.213. The definition of BWP and basic characteristics are listed below:
  A carrier bandwidth part is defined as follows (see 3GPP TS 38.211, Section 4.4.5): "A Carrier Bandwidth Part is a contiguous set of physical resource blocks, selected from a contiguous subset of the common resource blocks for a given numerology and cyclic prefix on a given carrier."
  NR Rel. 15 supports BWP sizes between 24 and 275 PRBs (400 MHz, 120 kHz SCS).
  NR supports 4 numerologies: {15, 30, 60 kHz} for SCS in FR1 (<6 GHz), and {60,120 kHz} for SCS in FR2 (>6 GHz).
  For paired spectrum (FDD), UE can be configured with an initial downlink/uplink BWP plus up to 4 downlink and up to 4 uplink BWPs in a serving cell.
  Only one carrier BWP can be active at a given time.
  The UE is not expected to transmit or receive PDSCH, PDCCH, CSI-RS, or TRS outside an active BWP. This means that the resource allocation in frequency to a UE should be within its active BWP(s) using the associated numerology.
  The bandwidth parts are indicated by a bandwidth part indicator which may comprise 1 or 2 bits:

TABLE 1

Bandwidth part indicator (BWPI), taken from
3GPP TS 38.212 v15.3.0 - Table 7.3.1.1.2-1

| Value of BWP indicator field | | Bandwidth part |
|---|---|---|
| 1 bit | 2 bits | |
| 0 | 0 | First bandwidth part configured by higher layers |
| 1 | 1 | Second bandwidth part configured by higher layers |
|   | 10 | Third bandwidth part configured by higher layers |
|   | 11 | Fourth bandwidth part configured by higher layers |

IN SUMMARY

Prior art: PDCP duplication in LTE/NR requires multi-frequency layers: two instances of a PDCP packet (i.e. two duplicates) shall be sent on different serving cells operating at different frequencies:
  In single-gNB scenarios, this is achieved by Carrier Aggregation based duplication, i.e. the duplicates are sent via two component carriers in the same gNB (i.e. PCell@F1+SCell@F2, where F1/F2 denotes the carrier frequency, e.g. 2.1 GHz).
  In multi-gNB scenarios, this is achieved by Dual Connectivity based duplication, i.e. the duplicates are sent via two nodes operating at different frequencies (i.e. PCell@F1 on the Master CG (MCG) plus PSCell@F2 on the Secondary CG (SCG)).
The reason for such requirement is to avoid that two serving CCs of a UE cause interference to each other.

In the prior art, a carrier may comprise plural active BWP. However, a gNB may transmit (or receive) on only one of the active BWPs at a time to a given UE.

SUMMARY OF THE INVENTION

It is an object of the present invention to improve the prior art.

According to a first aspect of the invention, there is provided an apparatus, comprising means for instructing configured to instruct a first cell to transmit a first packet data unit to a terminal on a first active bandwidth part of a first carrier of the first cell in a first frame having a first system frame number and to instruct a second cell to transmit a second packet data unit to the terminal on a second active bandwidth part of a second carrier of the second cell in a second frame having a second system frame number; wherein the first bandwidth part has a first bandwidth part identifier; the second bandwidth part has a second bandwidth part identifier; if the first cell is the same as the second cell: the first bandwidth part identifier is different from the second bandwidth part identifier, and the first system frame number is the same as the second system frame number; and if the first cell is different from the second cell: a frequency range of the first carrier is the same as the frequency range of the second carrier.

According to a second aspect of the invention, there is provided an apparatus, comprising means for monitoring configured to monitor if a first packet data unit for a terminal is received on a first active bandwidth part of a first carrier in a first frame having a first system frame number and a second packet data unit for the terminal is received on a second active bandwidth part of a second carrier in a second frame having a second system frame number; means for instructing configured to instruct a processing device of the terminal to process at least one of the first packet data unit and the second packet data unit if the first packet data unit and the second packet data unit are received; wherein the first bandwidth part has a first bandwidth part identifier; the second bandwidth part has a second bandwidth part identifier; if the first carrier is the same as the second carrier: the first bandwidth part identifier is different from the second bandwidth part identifier, and the first system frame number is the same as the second system frame number; if the first carrier is different from the second carrier: a frequency range of the first carrier is the same as the frequency range of the second carrier.

According to a third aspect of the invention, there is provided an apparatus, comprising means for instructing configured to instruct a transmitting device of a terminal to transmit a first packet data unit to a first cell on a first active bandwidth part of a first carrier of the first cell in a first frame having a first system frame number and to instruct the transmitting device to transmit a second packet data unit to the second cell on a second active bandwidth part of a second carrier of the second cell in a second frame having a second system frame number; wherein the first bandwidth part has a first bandwidth part identifier; the second bandwidth part has a second bandwidth part identifier; if the first cell is the same as the second cell: the first bandwidth part identifier is different from the second bandwidth part identifier, and the first system frame number is the same as the second system frame number; and if the first cell is different from the second cell: a frequency range of the first carrier is the same as the frequency range of the second carrier.

According to a fourth aspect of the invention, there is provided an apparatus, comprising means for monitoring configured to monitor if a first packet data unit from a terminal for a cell is received on a first active bandwidth part of a carrier of the cell in a first frame having a first system frame number and a second packet data unit from the terminal for the cell is received on a second active bandwidth part of the carrier of the cell in a second frame having a second system frame number; means for instructing configured to instruct a processing device of the cell to process at least one of the first packet data unit and the second packet data unit if the first packet data unit and the second packet data unit are received; wherein the first bandwidth part has a first bandwidth part identifier; the second bandwidth part has a second bandwidth part identifier; the first bandwidth part identifier is different from the second bandwidth part identifier, and the first system frame number is the same as the second system frame number.

According to a fifth aspect of the invention, there is provided a method, comprising instructing a first cell to transmit a first packet data unit to a terminal on a first active bandwidth part of a first carrier of the first cell in a first frame having a first system frame number and to instruct a second cell to transmit a second packet data unit to the terminal on a second active bandwidth part of a second carrier of the second cell in a second frame having a second system frame number; wherein the first bandwidth part has a first bandwidth part identifier; the second bandwidth part has a second bandwidth part identifier; if the first cell is the same as the second cell: the first bandwidth part identifier is different from the second bandwidth part identifier, and the first system frame number is the same as the second system frame number; and if the first cell is different from the second cell: a frequency range of the first carrier is the same as the frequency range of the second carrier.

According to a sixth aspect of the invention, there is provided a method, comprising monitoring if a first packet data unit for a terminal is received on a first active bandwidth part of a first carrier in a first frame having a first system frame number and a second packet data unit for the terminal is received on a second active bandwidth part of a second carrier in a second frame having a second system frame number; instructing a processing device of the terminal to process at least one of the first packet data unit and the second packet data unit if the first packet data unit and the second packet data unit are received; wherein the first bandwidth part has a first bandwidth part identifier; the second bandwidth part has a second bandwidth part identifier; if the first carrier is the same as the second carrier: the first bandwidth part identifier is different from the second bandwidth part identifier, and the first system frame number is the same as the second system frame number; if the first carrier is different from the second carrier: a frequency range of the first carrier is the same as the frequency range of the second carrier.

According to a seventh aspect of the invention, there is provided a method, comprising instructing a transmitting device of a terminal to transmit a first packet data unit to a first cell on a first active bandwidth part of a first carrier of the first cell in a first frame having a first system frame number and to instruct the transmitting device to transmit a second packet data unit to the second cell on a second active bandwidth part of a second carrier of the second cell in a second frame having a second system frame number; wherein the first bandwidth part has a first bandwidth part identifier; the second bandwidth part has a second bandwidth part identifier; if the first cell is the same as the second cell: the first bandwidth part identifier is different from the second bandwidth part identifier, and the first system frame number is the same as the second system frame number; and if the first cell is different from the second cell: a frequency range of the first carrier is the same as the frequency range of the second carrier.

According to an eighth aspect of the invention, there is provided a method, comprising monitoring if a first packet data unit from a terminal for a cell is received on a first active bandwidth part of a carrier of the cell in a first frame having a first system frame number and a second packet data unit from the terminal for the cell is received on a second active bandwidth part of the carrier of the cell in a second frame having a second system frame number; instructing a processing device of the cell to process at least one of the first packet data unit and the second packet data unit if the first packet data unit and the second packet data unit are received; wherein the first bandwidth part has a first bandwidth part identifier; the second bandwidth part has a second bandwidth part identifier; the first bandwidth part identifier is different from the second bandwidth part identifier, and the first system frame number is the same as the second system frame number.

Each of the methods of the fifth to eighth aspects may be a method of bandwidth part aggregation.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some example embodiments of the invention, at least one of the following advantages may be achieved:
- higher flexibility for exploiting the available bandwidth;
  - in particular: bandwidth splitting for PDCP duplication does not affect the available bandwidth for traffic without PDCP duplication;
  - additionally, bandwidth splitting entails inserting guard bands between the CCs, namely, at the two edge frequencies of each component carrier, to avoid cross-interference, but at the cost of unutilized parts of the carrier.
- reduced energy consumption at UE and gNB;
- transmission reliability may be enhanced.

Further advantages become apparent from the following detailed description.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of the invention improve the radio resource efficiency when operating PDCP data duplication for URLLC in an intra-gNB deployment, i.e., the two (or more) transmission paths to convey the packet duplicates are instantiated at the same gNB. In PDCP duplication of Rel-15, duplication with only one carrier is not possible. According to some example embodiments of the invention, this restriction is overcome.

When PDCP data duplication is supported in the intra-gNB scenario, the adoption of CA may bring a severe limitation to the frequency deployment, because of the need of partitioning the available bandwidth in multiple chunks (i.e., the CCs). As an example, given a (small) cell having a total system bandwidth B=20 MHz, two CCs need to be deployed to operate in CA, each with, e.g., half bandwidth $B_1$ and $B_2$, such that $B_1+B_2=B$. In particular,
CC1 may have center frequency $F_1$=3.495 GHz with $B_1$=10 MHz, and
CC2 may have center frequency F, =3.505 GHz with $B_2$=10 MHz.

Such bandwidth partitioning may lead to suboptimal system performance and end-user performance. For instance, the same (small) cell may be serving other kinds of traffic than URLLC, with heterogeneous requirements. For example, enhanced mobile broadband (eMBB) users or massive machine-type communication (mMTC) devices may require the usage of a transmission bandwidth exceeding $B_1$ or $B_2$ to receive large amounts of data for, e.g., video streaming and firmware updates, respectively. However, they cannot use the total bandwidth B without employing CA. Thus, eMBB/mMTC users may be forced to employ CA (if supported by the UE) to meet their capacity requirements, which results in a larger UE power usage due to the CA operations.

The prior art results in a severe limitation to the frequency deployment because of the need of partitioning (fragmenting) the available bandwidth in at least two chunks (i.e., the CCs) in order to operate the duplication. Such bandwidth partitioning may lead to suboptimal system performance and end-user performance for those devices that may require the usage of a transmission bandwidth exceeding the fragmented size, e.g., video streaming and firmware updates. These users may be forced to employ CA (if supported by the UE) to meet their capacity requirements, which results in a larger UE power usage and more signaling (for measurements configuration and reporting, setting up of CA), and having to rely on a slow mechanism to adjust the used CCs.

Some example embodiments of the invention realize CA within a carrier, without splitting it in component carriers, by a dynamic radio resource partitioning in "virtual" CCs, which can be assigned to a UE as function of the type of service, etc. Thus, some example embodiments of the invention address the negative impact of hard radio resource partitioning of CA. The regular NR BWP (as explained in the prior art section) is assumed and used in some example embodiments of the invention but the invention is not limited to the detailed values defined for any 3GPP release.

Thus, some example embodiments of the invention solve the above limitation as follows:
  a) Intra-node BWP-based PDCP duplication (as an extension of CA-based duplication, and
  b) Inter-node BWP-based PDCP duplication (as an extension of DC-based duplication): non-overlapping BWPs and/or non-overlapping transmission frames can be assigned to a DC UE by two nodes operating at the same carrier frequency. To coordinate BWP assignment between the nodes (gNBs), a new Xn signaling may be used. In intra-frequency DC, the master gNB does not directly control the secondary gNB's transmitting device. After the two gNBs have agreed on the operational mode (e.g. to use frequency separation (non-overlapping BWPs) and/or time separation (non-overlapping transmission frames)), they transmit in an independent way as far as the agreed restrictions are met.

Some example embodiments of the invention provide PDCP data duplication in a single-cell scenario having a single carrier by defining and assigning to a UE "virtual" component carriers (vCC), rather than actual carriers. Two or more vCCs within the same carrier may be assigned to the UE. Each of them is mapped to a distinct RLC entity (associated to the PDCP layer and carrying PDCP packet duplicates). A vCC can be realized by a BWP, meaning that a UE has two or more active BWPs in the same carrier simultaneously, essentially realizing BWP aggregation for data duplication. gNB informs the UE about the vCCs by a new RRC signaling or a modification of an existing RRC signaling.

Figure 2:
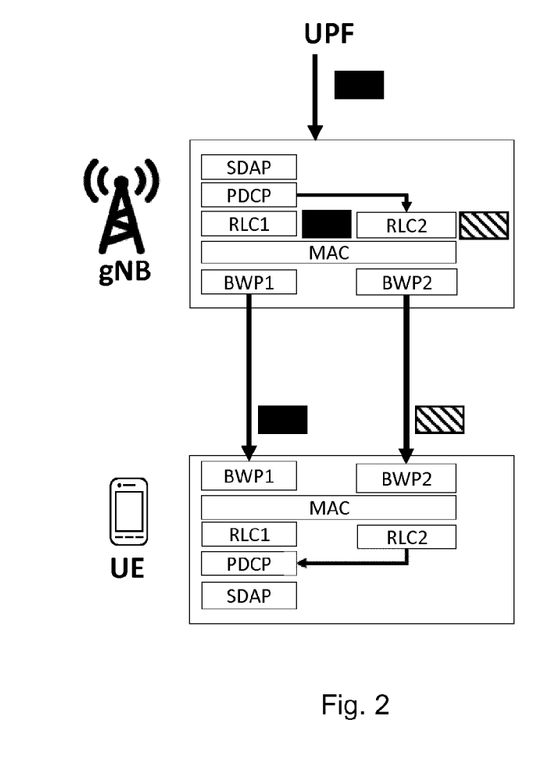
FIG. 2 shows a concept of PDCP data duplication according to some example embodiments of the invention.

FIG. 2 illustrates a general concept of some example embodiments of the invention. FIG. 2 corresponds to FIG. 1 except for the following: after the PDU (black box) received from the core (e.g. UPF) is duplicated by PDCP (shown as black box and dashed box in FIG. 2) and forwarded to the different RLC entities (RLC1, RLC2), they are provided to the same MAC entity which applies BWP masking. That is, the MAC layer has active BWP masks accounting for the vCCs (active BWPs: BWP1 and BWP2 different from BWP1 (i.e., not overlapping with BWP1)) limitations when scheduling the UE. Thus, the duplicate of RLC1 is transmitted on BWP1, and the duplicate of RLC2 is transmitted on BWP2.

On the UE side, the duplicates are received on the different BWPs (BWP1 and BWP2), and forwarded by the single MAC layer to RLC1 and RLC2, respectively. The UE's PDCP layer understands that the PDUs received from MAC layer are duplicates because of their same sequence number. The UE's PDCP layer processes the duplicates received from MAC layer accordingly. For example, it may forward the earlier received one of the duplicates to SDAP layer and discard the later received one. As another example, it may combine the received duplicates and forward the combined PDU to SDAP layer.

FIG. 2 shows an example embodiment of the invention where the PDCP layer generates two duplicates. However, in some example embodiments of the invention, more than two "duplicates" may be generated.

Figure 3:
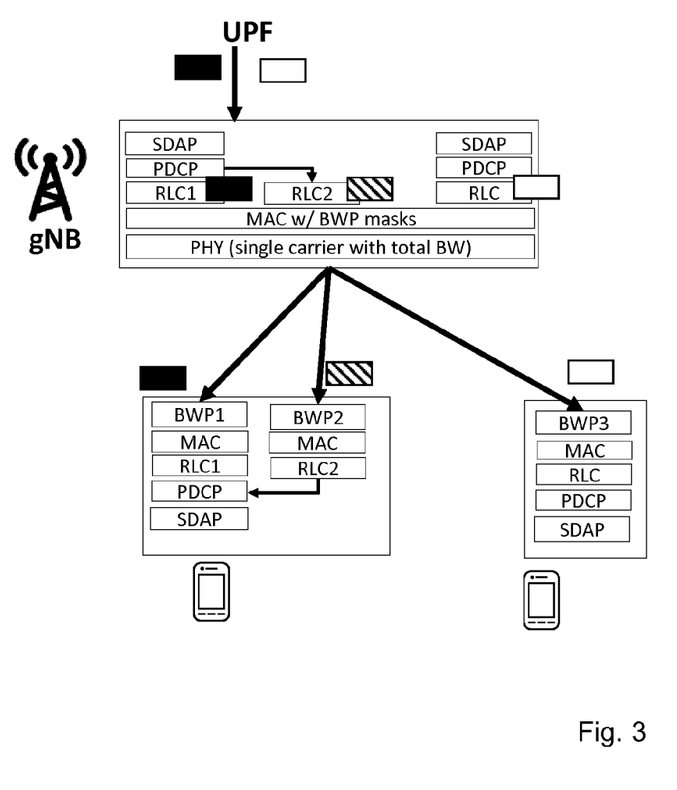
FIG. 3 shows a concept of PDCP data duplication according to some example embodiments of the invention.

FIG. 3 illustrates another example embodiment of the invention. The left part of FIG. 3 related to UE1 corresponds substantially to FIG. 2. That is, for UE1 (URLLC), there are two separated active BWPs (BWP1 and BWP2). The PDU received for UE1 (black box) is duplicated by PDCP layer (black box and dashed box) and transmitted over different active BWPs (BWP1 and BWP2), same as in FIG. 2. For UE2 (eMBB), there is a single active BWP (BWP3) covering the full carrier bandwidth (the active BWPs are shown schematically on the right side of FIG. 2). The PDU received from the core network (e.g. UPF) for UE2 (white box) is not duplicated but transmitted only once in BWP3.

On the UE side, UE1 (URLCC) maps each active BWP to a respective RLC entity and combines the received PDUs in PDCP. On the other hand, UE2 (eMBB) works as conventionally known without PDCP duplication. In the following, the terms vCC and active BWP are used interchangeably.

In the example embodiment of FIG. 3, BWP3 has the full carrier bandwidth. However, the bandwidth of an active BWP not related to PDCP data duplication is arbitrary within the carrier bandwidth. It may or may not overlap active BWPs used for transmission of PDCP duplicates.

In the following, some example embodiments of the invention are described in detail. Here, a downlink transmission is taken as an example, but some example embodiments of the invention are applicable to uplink (instead of downlink or in addition to downlink).

We consider a cell, identified by a cell identifier, which accommodates various kinds of UEs with different traffic demands, e.g., eMBB, mMTC, and URLLC. The cell operates on the entire carrier with transmission bandwidth B around its carrier frequency (central frequency) F. The gNB determines and assigns to a URLLC UE two non-overlapping parts of the carrier bandwidth, i.e., first downlink BWP (BWP1) and second downlink BWP (BWP2) as two vCCs for CA operations with PDCP data duplication. Both BWPs may be active at the same time allowing the network to schedule two packet duplicates towards the UE (substantially simultaneously, i.e. in a same frame having a system frame number) in the two BWPs. Note that we are relaxing the requirement of a single active BWP at a given time towards the same UE, which is so far considered in NR Rel. 15 specifications (see prior art).

In order to achieve transmit diversity of the transmissions occurring via distinct BWPs within the same carrier, on one hand two independent transport blocks (TBs) are sent via the simultaneously active BWPs. On the other hand, the BWPs for a URLLC UE are assigned in such a way to boost frequency diversity, thus separating them in the frequency domain to benefit from the fluctuations in interference level across the carrier. In one example, the gNB allocates them at the edges of the carrier bandwidth, as shown in FIG. 3.

At the UE side, these vCCs are treated as conventional CCs or active BWPs, performing regular operations on each vCC according to typical CC and/or BWP operations. The operations in a downlink BWP comprise performing RSRP/RSRQ/CQI/CSI measurements and related reporting, HARQ operations, as well as monitoring the PDCCH.

The network configures PDCP duplication, and sends the configured BWP configuration (e.g. as part of the ServingCellConfig RRC message) to the UE, indicating the dedicated N BWPs (e.g., N=4) with their identifier (BWP-Id), and in addition indicates that M (e.g., M=2) BWPs should be active simultaneously. Also, the configuration further indicates that these BWPs are mapped to the RLC entities associated to PDCP entity for which PDCP data duplication was configured.

The above configurations could be conveyed in different ways. For instance, assuming DL BWP1, DL BWP2, and DL BWP3 are configured to the UE with corresponding BWP-Id1, BWP-Id2, and BWP-Id3, combinations of these can be mapped to a new BWP Configuration Index (BWPCI) or alike, which determines which BWP(s) should be active. An example is provided below. DCI-based switching between these configurations for the same UE can be realized easily, e.g. by using the index BWPCI above as value in the BWP Indicator (BWPI) field present in the DCI formats 1-1/0-1 (DL/UL configurable unicast format).

BWPCI 1: BWP-Id1, i.e. only BWP-Id1 should be active.
BWPCI 2: BWP-Id2, i.e. only BWP-Id2 should be active
BWPCI 3: BWP-Id3, i.e. only BWP-Id3 should be active
BWPCI 4: BWP-Id1+BWP-Id2, i.e. BWP1 and BWP2 are paired and have to be active simultaneously.

Figure 4:
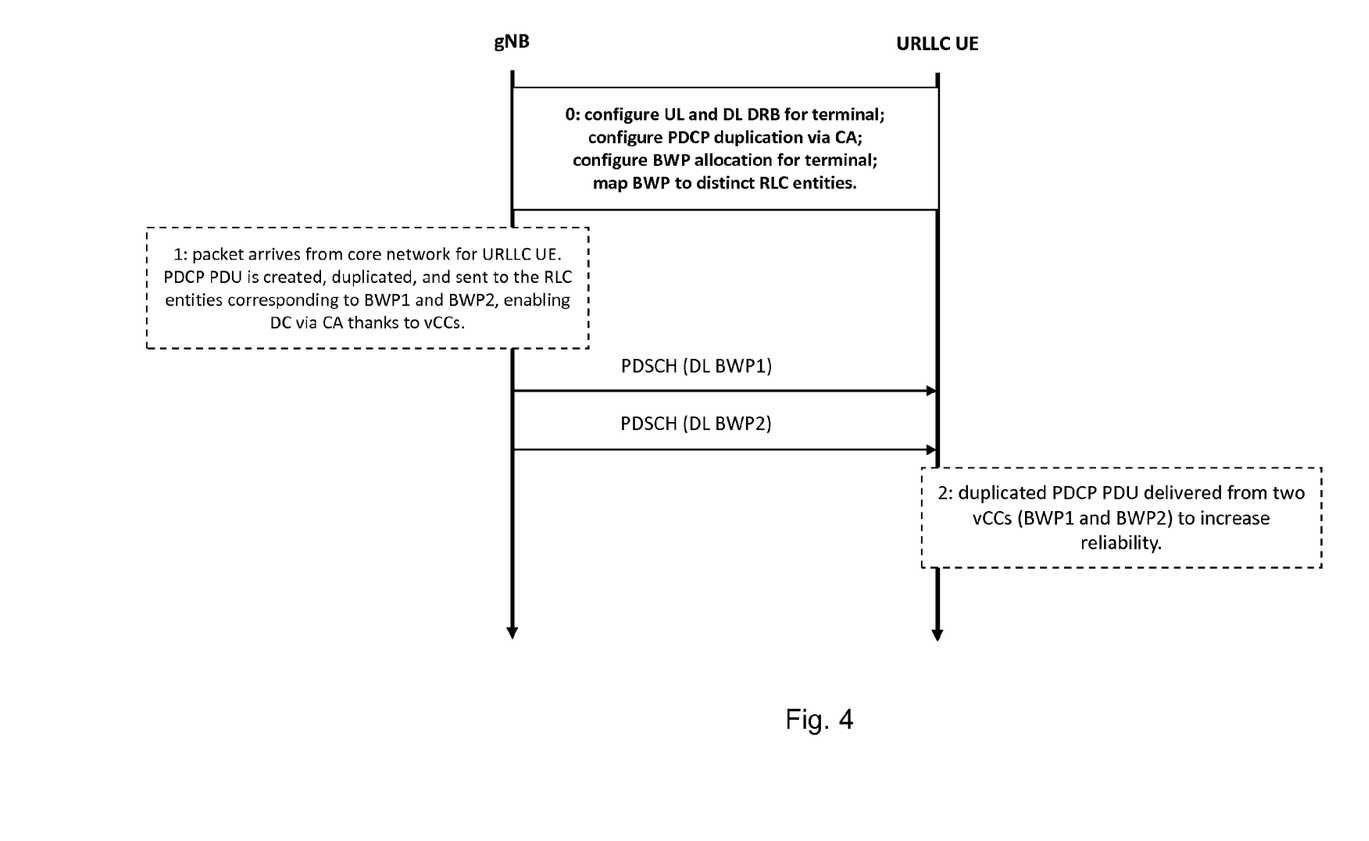
FIG. 4 shows a flowchart according to an example embodiment of the invention.

A flow chart summarizing an example of the method is provided in FIG. 4. Horizontal arrows indicate active parallel transmission links. It is noted that the UE understands that a received PDU is a duplicate of another received PDU because these PDUs have the same sequence number.

Coexistence Between Regular Operations and PDCP Duplication Through Virtual-CCs

In the following, the gNB operations comprising the scheduling operations for the coexistence of URLLC and eMBB/eMTC UEs are described.

The assignment of the active BWPs for the various UEs is done as function e.g. of their applications (or the QoS required by the applications). Also, the quality of the active BWPs (e.g. radio signal strength/quality, SINR, achievable BLER, etc.) may be taken into account. For instance, out of the dedicated BWPs, the gNB will assign:

one larger active BWP whose size is up to the entire available bandwidth for delay-tolerant downlink traffic (e.g., eMBB and mMTC), two or more active BWPs (vCCs) to URLLC UEs, who benefit from data duplication.

During the scheduling operations, where frequency resources (PRBs) have to be assigned to a UE, the MAC scheduler will apply appropriate masks certain BWPs when scheduling a UE, accounting for a UE's active BWP(s) and their potential restrictions.

In this way, the gNB has the maximum flexibility in scheduling downlink traffic for delay-tolerant applications (background traffic) on the entire pool of radio resources, so that the background traffic achieves the maximum system capacity. This target is achieved by defining a single active BWP, namely BWP3 in FIG. 3 (with a bandwidth equal to e.g. the entire transmission bandwidth) for UEs requiring broadband downlink traffic at less-stringent delay requirements. On the other hand, upon scheduling URLLC downlink transmissions, the gNB is allowed to define distinct transmission paths via the vCCs (BWP1 and BWP2) that exploit the frequency diversity to improve the transmission reliability.

Some example embodiments of this invention make PDCP packet duplication applicable to single-frequency layer (i.e. single carrier) scenarios. Thus, a single cell is able to realize CA and PDCP duplication without the need to partition its bandwidth into CCs. It allows the gNB to serve delay-tolerant downlink traffic exploiting the maximum scheduling flexibility, since the entire pool of downlink radio resources is available. On the other hand, for URLLC downlink transmissions, the gNB can exploit the frequency diversity allocating multiple active BWPs, which represent virtual component carriers, for the transmission of duplicates.

Figure 5:
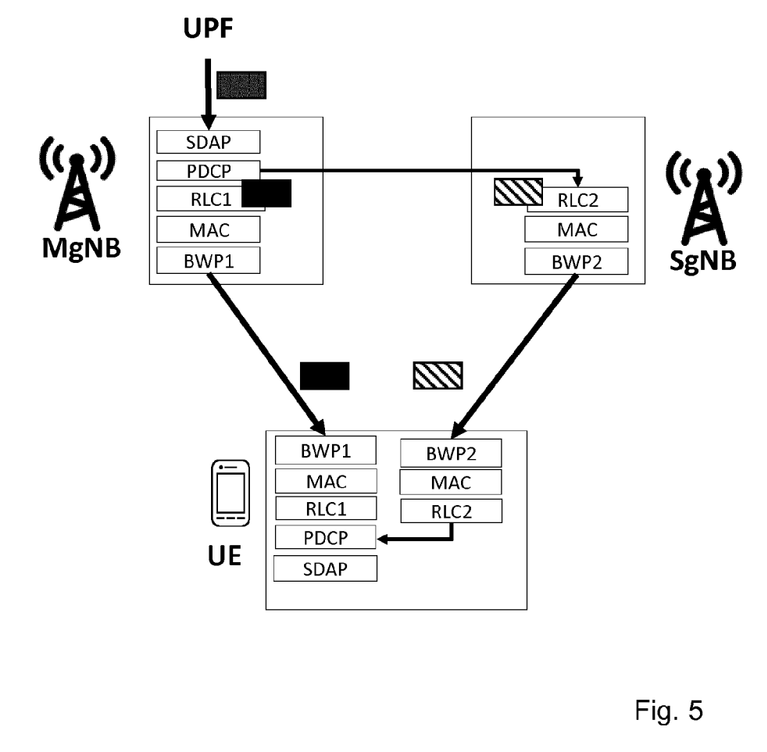
FIG. 5 shows a concept of PDCP data duplication according to some example embodiments of the invention.

Some example embodiments of the invention are applicable to intra-frequency dual connectivity. In such scenario, inter-node BWP-based PDCP duplication is supported (as an extension of DC-based duplication): non-overlapping BWPs and/or transmission frames can be assigned to a DC UE by two nodes operating at the same carrier frequency. For this, a new Xn signaling may be defined to coordinate BWP assignment. An example embodiment is shown in FIG. 5. FIG. 5 corresponds to FIG. 2 for a case of inter-node BWP-based PDCP duplication.

Note that two independent transmissions using (e.g.) half of the bandwidth (N/2) can bring benefit over one unique transmission using (e.g.) full bandwidth for the following scenarios and reasons:

As duplication will be used for URLLC applications, which typically have small payload size (e.g. 20 B), half of the bandwidth may be sufficient to operate at the lowest MCS the standard allows (e.g. QPSK 1/8) in most of the cases. Therefore, having more bandwidth can only afford using additional coding means, such as padding, which are rather inefficient. Note that typically coding becomes inefficient at the lowest coding rate.

The supported bandwidth of the UE may be much smaller than the system bandwidth of the serving cell, and therefore the UE cannot benefit from a larger bandwidth without fragmenting the spectrum in component carriers—unless some example embodiments of this invention are used. Especially in millimeter waves scenarios, the available spectrum is rather large (e.g. several hundreds of MHz) and from a complexity point of view, it is simpler for a UE to have 4 receivers operating e.g. at a maximum BW of 100 MHz rather than having one receiver operating at 400 MHz. Note that the mmW scenarios are currently considered as promising in the Rel-16 URLLC SI (see 3GPP R1-1900976 or 3GPP R1-1900171).

Also, the two major sources of packet errors are errors in link adaptation (i.e. the estimated MCS was wrong) and interference (the SINR at the time of transmission degraded because of interference). By having two independent transmissions we can achieve more diversity in respect of both errors as compared to have one unique transmission. Details of combining the received PDUs on the UE side are explained e.g. in PCT/FI2018/050918. The method proposes a light coordinated transmission at the two nodes/component carriers of a PDCP PDU and its duplicate and their combining at the receiver side, where the combining is applied at PHY by soft information combining of the TBs carrying the original and duplicated PDCP PDU.

In some example embodiments, UE considers only the first received PDU of the multiplied (duplicated) PDU, and discards the later received duplicates. Thus, latency may be reduced.

Additionally, for the two independent transmissions, their MCS can be optimized separately, whereas the MCS level of the unique transmission will be suboptimal, since the effective SINR over the entire transmission bandwidth (which determines the actual MCS) may degrade. I.e. the PRBs with lower SINR will negatively impact the effective SINR computed via EESM.

In case of DC/inter-node: in addition to the motivations above, there is another fundamental reason: having two transmissions on two nodes can achieve load balancing across the nodes, whereas each node may not have enough bandwidth available.

Some example embodiments of the invention entail the need for the UE to have RF receiver and transmitter chains dedicated to the operations of the BWPs, which are simultaneously active, removing the need to retune an RF chain at the BWP switching (thus, removing the associated delay). It may also mean that at a given time, a UE can either support CA by aggregating BWPs within one carrier, or regular CA operations (in which multiple carriers are present and configured for the UE).

PDCP duplication is an example where the concept of vCCs is particularly useful. However, according to some example embodiments of the invention, the concept of vCCs may be applied to transmissions of arbitrary PDUs. That is, the PDUs transmitted on different vCCs in the same transmission frame (in case of a single cell) or on the same carrier frequency (in case of plural cells) may or may not be duplications of each other.

Figure 6:
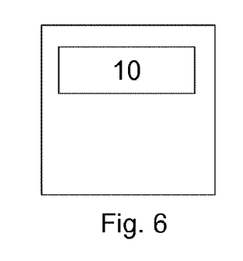
FIG. 6 shows an apparatus according to an example embodiment of the invention.
Figure 7:
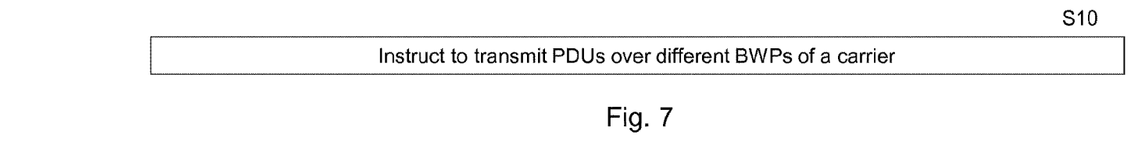
FIG. 7 shows a method according to an example embodiment of the invention.

FIG. 6 shows an apparatus according to an example embodiment of the invention. The apparatus may be a base station (e.g. gNB or eNB) or an element thereof. In particular, it may be a base station in downlink communication. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for instructing 10. The means for instructing 10 may be an instructing means. The means for instructing 10 may be an instructor. The means for instructing 10 may be an instructing processor.

The means for instructing 10 instructs a first cell to transmit a first packet data unit to a terminal on a first active bandwidth part of a first carrier of the first cell in a first frame and to instruct a second cell to transmit a second packet data unit to the terminal on a second active bandwidth part of a second carrier of the second cell in a second frame (S10). The first frame has a first system frame number, and the second frame has a second system frame number. The first bandwidth part has a first bandwidth part identifier, and the second bandwidth part has a second bandwidth part identifier.

If the first cell is the same as the second cell: the first bandwidth part identifier is different from the second bandwidth part identifier, and the first system frame number is the same as the second system frame number.

If the first cell is different from the second cell: a frequency range of the first carrier is the same as the frequency range of the second carrier.

Figure 8:
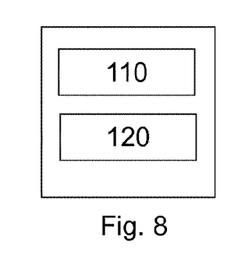
FIG. 8 shows an apparatus according to an example embodiment of the invention.
Figure 9:
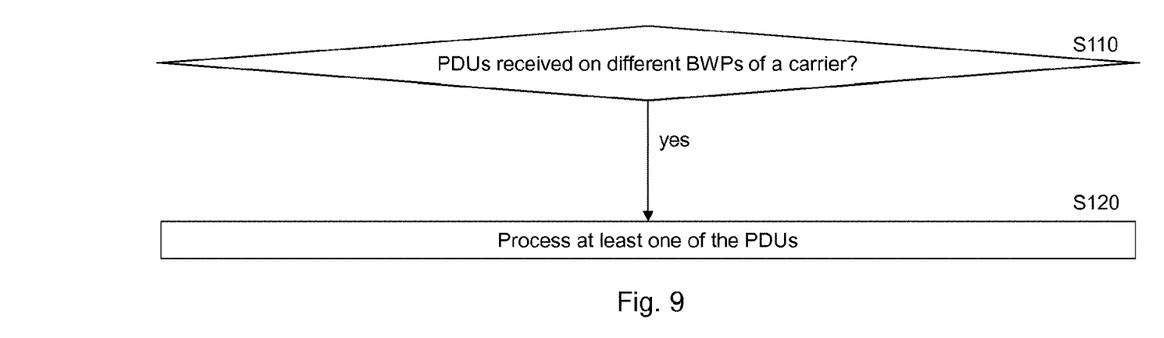
FIG. 9 shows a method according to an example embodiment of the invention.

FIG. 8 shows an apparatus according to an example embodiment of the invention. The apparatus may be a terminal (e.g. UE) or an element thereof. In particular, it may be a terminal in downlink communication. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for monitoring 110 and means for instructing 120. The means for monitoring 110 and means for instructing 120 may be a monitoring means and instructing means, respectively. The means for monitoring 110 and means for instructing 120 may be a monitor and instructor, respectively. The means for monitoring 110 and means for instructing 120 may be a monitoring processor and instructing processor, respectively.

The means for monitoring 110 monitors if a first packet data unit for a terminal is received on a first active bandwidth part of a first carrier in a first frame and a second packet data unit for the terminal is received on a second active bandwidth part of a second carrier in a second frame (S110). The first frame has a first system frame number, and the second frame has a second system frame number. The first bandwidth part has a first bandwidth part identifier, and the second bandwidth part has a second bandwidth part identifier.

If the first packet data unit and the second packet data unit are received (S110=yes), the means for instructing 120 instructs a processing device of the terminal to process at least one of the first packet data unit and the second packet data unit (S120).

If the first carrier is the same as the second carrier: the first bandwidth part identifier is different from the second bandwidth part identifier, and the first system frame number is the same as the second system frame number.

If the first carrier is different from the second carrier: a frequency range of the first carrier is the same as the frequency range of the second carrier.

Figure 10:
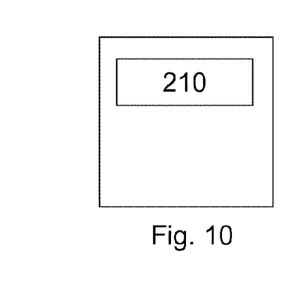
FIG. 10 shows an apparatus according to an example embodiment of the invention.
Figure 11:
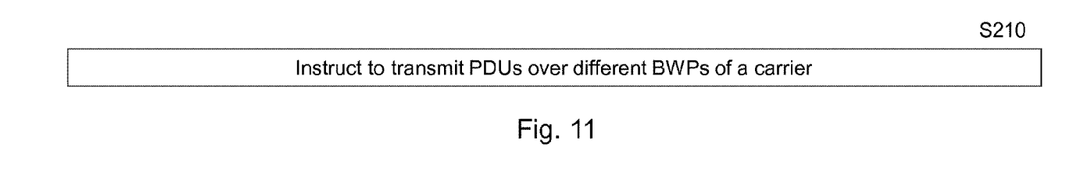
FIG. 11 shows a method according to an example embodiment of the invention.

FIG. 10 shows an apparatus according to an example embodiment of the invention. The apparatus may be a terminal (e.g. UE) or an element thereof. In particular, it may be a terminal in uplink communication. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for instructing 210. The means for instructing 210 may be an instructing means. The means for instructing 210 may be an instructor. The means for instructing 210 may be an instructing processor.

The means for instructing 210 instructs a transmitting device of a terminal to transmit a first packet data unit to a first cell on a first active bandwidth part of a first carrier of the first cell in a first frame and to instruct the transmitting device to transmit a second packet data unit to the second cell on a second active bandwidth part of a second carrier of the second cell in a second frame (S210). The first frame has a first system frame number, and the second frame has a second system frame number. The first bandwidth part has a first bandwidth part identifier, and the second bandwidth part has a second bandwidth part identifier.

If the first cell is the same as the second cell: the first bandwidth part identifier is different from the second bandwidth part identifier, and the first system frame number is the same as the second system frame number.

If the first cell is different from the second cell: a frequency range of the first carrier is the same as the frequency range of the second carrier.

Figure 12:
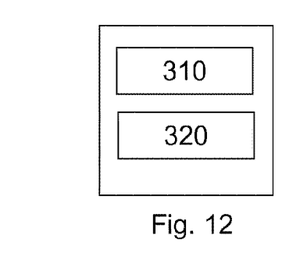
FIG. 12 shows an apparatus according to an example embodiment of the invention.
Figure 13:
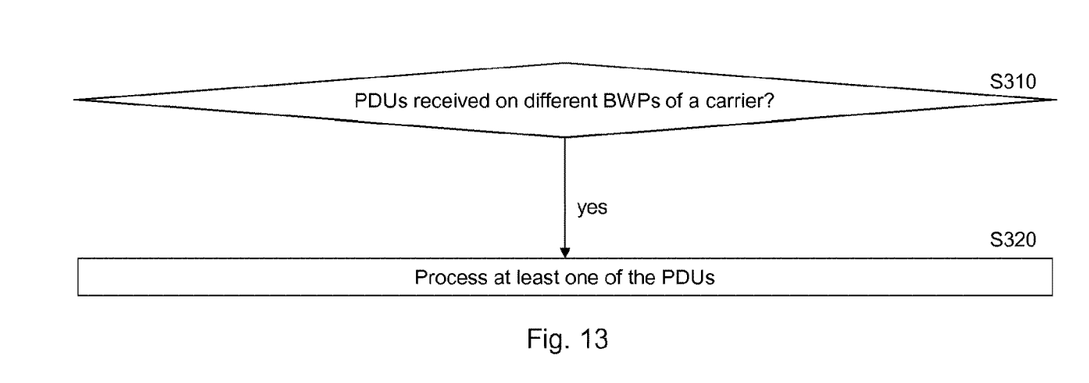
FIG. 13 shows a method according to an example embodiment of the invention.

FIG. 12 shows an apparatus according to an example embodiment of the invention. The apparatus may be a base station (e.g. gNB or eNB) or an element thereof. In particular, it may be a base station in uplink communication. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for monitoring 310 and means for instructing 320. The means for monitoring 310 and means for instructing 320 may be a monitoring means and instructing means, respectively. The means for monitoring 310 and means for instructing 320 may be a monitor and instructor, respectively. The means for monitoring 310 and means for instructing 320 may be a monitoring processor and instructing processor, respectively.

The means for monitoring 310 monitor if a first packet data unit from a terminal for a cell is received on a first active bandwidth part of a carrier of the cell in a first and a second packet data unit from the terminal for the cell is received on a second active bandwidth part of the carrier of the cell in a second frame (S310).

The first frame has a first system frame number, and the second frame has a second system frame number. The first system frame number is the same as the second system frame number.

The first bandwidth part has a first bandwidth part identifier, and the second bandwidth part has a second bandwidth part identifier. The first bandwidth part identifier is different from the second bandwidth part identifier.

If the first packet data unit and the second packet data unit are received (S310=yes), the means for instructing 320 instructs a processing device of the cell to process at least one of the first packet data unit and the second packet data unit (S320).

Figure 14:
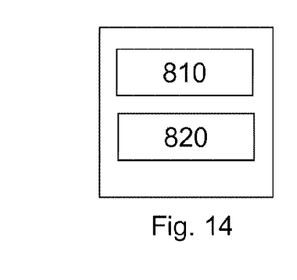
FIG. 14 shows an apparatus according to an example embodiment of the invention.

FIG. 14 shows an apparatus according to an example embodiment of the invention. The apparatus comprises at least one processor 810 and at least one memory 820 including computer program code, and the at least one processor 810, with the at least one memory 820 and the computer program code, being arranged to cause the apparatus to at least perform at least one of the methods according to FIGS. 7, 9, 11, and 13 and related description.

Some example embodiments of the invention are described which are based on a 3GPP network (e.g. NR). However, the invention is not limited to NR. It may be applied to any generation (3G, 4G, 5G, etc.) of 3GPP networks.

Some example embodiments of the invention are described in detail for a downlink transmission. However, some example embodiments of the invention are applicable to the uplink where the UE transmits on two or more active bandwidth parts in a same transmission frame.

A UE is an example of a terminal. However, the terminal (UE) may be any device capable to connect to the (3GPP) radio network such as a MTC device, a IoT device etc.

The cell may be a part of a base station. A base station may comprise one or more cells. A base station may be e.g. a gNB, eNB, or a NodeB. As outlined hereinabove, a cell (and its carrier) is identified by its cell identifier. However, the transmission chain of the cell (e.g. gNB) is not limited to a specific implementation. For example, it may comprise Remote Radio Head(s), antenna panel(s)/element(s), TRP(s) (transmission and reception points). Each Radio unit is connected to antenna(s) serving a particular direction, and thus forming a cell.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal (such as a UE), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite acting as a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising at least one processor, at least one memory including computer program code, and the at least one processor, with the at least one memory and the computer program code, being arranged to cause the apparatus to at least:
monitor if a first packet data unit for a terminal is received on a first active bandwidth part of a first carrier in a first frame having a first system frame number and a second packet data unit for the terminal is received on a second active bandwidth part of a second carrier in a second frame having a second system frame number; and
instruct a processing device of the terminal to process at least one of the first packet data unit and the second packet data unit if the first packet data unit and the second packet data unit are received; wherein
the first active bandwidth part has a first bandwidth part identifier;
the second active bandwidth part has a second bandwidth part identifier; and if the first carrier is the same as the second carrier: the first bandwidth part identifier is different from the second bandwidth part identifier, and the first system frame number is the same as the second system frame number; or if the first carrier is different from the second carrier: a frequency range of the first carrier is the same as a frequency range of the second carrier, wherein the first bandwidth part identifier identifies a first frequency chunk of the first carrier; and the second bandwidth part identifier identifies a second frequency chunk of the second carrier; if the first carrier is different from the second carrier at least one of the following conditions is fulfilled:

the first frequency chunk does not overlap the second frequency chunk; and the first system frame number is different from the second system frame number.

2. The apparatus according to claim 1, wherein the at least one memory and the computer program code are configured to, with the at least one processor, cause the apparatus at least to:

supervise if an indication is received, wherein the indication indicates that the first packet data unit is transmitted on the first active bandwidth part and the second packet data unit is transmitted on the second active bandwidth part; and inhibit monitoring if the indication is not received.

3. The apparatus according to claim 2, wherein the indication comprises configuration data of the first active bandwidth part and the second active bandwidth part.

4. The apparatus according to claim 1, wherein the at least one memory and the computer program code are configured to, with the at least one processor, cause the apparatus at least to:

check if the second packet data unit is a duplicate of the first packet data unit; and generate a received packet data unit from at least one of the first packet data unit and the second packet data unit if the second packet data unit is the duplicate of the first packet data unit.

5. The apparatus according to claim 4, wherein the at least one memory and the computer program code are configured to, with the at least one processor, cause the apparatus at least to generate the received packet data unit from the earlier received one of the first packet data unit and the second packet data unit and to discard the later received one of the first packet data unit and the second packet data unit.

6. The apparatus according to claim 4, wherein the at least one memory and the computer program code are configured to, with the at least one processor, cause the apparatus at least to generate the received packet data unit by combining the first packet data unit and the second packet data unit.

7. The apparatus according to claim 1, wherein the first packet data unit and the second data packet unit are received from a same cell or a different cell.

8. A method, comprising:

monitoring if a first packet data unit for a terminal is received on a first active bandwidth part of a first carrier in a first frame having a first system frame number and a second packet data unit for the terminal is received on a second active bandwidth part of a second carrier in a second frame having a second system frame number; and instructing a processing device of the terminal to process at least one of the first packet data unit and the second packet data unit if the first packet data unit and the second packet data unit are received; wherein the first active bandwidth part has a first bandwidth part identifier;

the second active bandwidth part has a second bandwidth part identifier; and if the first carrier is the same as the second carrier: the first bandwidth part identifier is different from the second bandwidth part identifier, and the first system frame number is the same as the second system frame number; or if the first carrier is different from the second carrier: a frequency range of the first carrier is the same as a frequency range of the second carrier, wherein the first bandwidth part identifier identifies a first frequency chunk of the first carrier; and the second bandwidth part identifier identifies a second frequency chunk of the second carrier; if the first carrier is different from the second carrier at least one of the following conditions is fulfilled:

the first frequency chunk does not overlap the second frequency chunk; and the first system frame number is different from the second system frame number.

9. The method according to claim 8, further comprising:

supervising if an indication is received, wherein the indication indicates that the first packet data unit is transmitted on the first active bandwidth part and the second packet data unit is transmitted on the second active bandwidth part; and inhibiting the monitoring if the indication is not received.

10. The method according to claim 9, wherein the indication comprises configuration data of the first active bandwidth part and the second active bandwidth part.

11. The method according to claim 8, further comprising:

checking if the second packet data unit is a duplicate of the first packet data unit; and generating a received packet data unit from at least one of the first packet data unit and the second packet data unit if the second packet data unit is the duplicate of the first packet data unit.

12. The method according to claim 11, wherein the generating comprises generating the received packet data unit from the earlier received one of the first packet data unit and the second packet data unit and to discard the later received one of the first packet data unit and the second packet data unit.

13. The method according to claim 11, wherein the generating comprises generating the received packet data unit by combining the first packet data unit and the second packet data unit.

14. The method according to claim 8, wherein the first packet data unit and the second data packet unit are received from a same cell or different cells.

15. A non-transitory computer readable medium comprising program instructions for causing an apparatus to perform at least the following:

monitoring if a first packet data unit for a terminal is received on a first active bandwidth part of a first carrier in a first frame having a first system frame number and a second packet data unit for the terminal is received on a second active bandwidth part of a second carrier in a second frame having a second system frame number; and instructing a processing device of the terminal to process at least one of the first packet data unit and the second packet data unit if the first packet data unit and the second packet data unit are received; wherein the first active bandwidth part has a first bandwidth part identifier;

the second active bandwidth part has a second bandwidth part identifier; and if the first carrier is the same as the second carrier: the first bandwidth part identifier is different from the second bandwidth part identifier, and the first system frame number is the same as the second system frame number; or if the first carrier is different from the second carrier: a frequency range of the first carrier is the same as a frequency range of the second carrier, wherein the first bandwidth part identifier identifies a first frequency chunk of the first carrier; and the second bandwidth part identifier identifies a second frequency chunk of the second carrier; if the first carrier is different from the second carrier at least one of the following conditions is fulfilled:

the first frequency chunk does not overlap the second frequency chunk; and the first system frame number is different from the second system frame number.

16. The non-transitory computer readable medium according to claim 15, wherein the program instructions further cause the apparatus to perform at least the following:

supervising if an indication is received, wherein the indication indicates that the first packet data unit is transmitted on the first active bandwidth part and the second packet data unit is transmitted on the second active bandwidth part; and inhibiting the monitoring if the indication is not received, wherein the indication comprises configuration data of the first active bandwidth part and the second active bandwidth part.

* * * * *